(12) United States Patent
Jonnalagedda et al.

(10) Patent No.: US 11,836,972 B2
(45) Date of Patent: *Dec. 5, 2023

(54) MACHINE LEARNING PIPELINE FOR DOCUMENT IMAGE QUALITY DETECTION AND CORRECTION

(71) Applicant: INTUIT INC., Mountain View, CA (US)

(72) Inventors: Saisri Padmaja Jonnalagedda, Mountain View, CA (US); Xiao Xiao, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,476

(22) Filed: Dec. 28, 2022

(65) Prior Publication Data
US 2023/0141189 A1    May 11, 2023

Related U.S. Application Data

(63) Continuation of application No. 17/243,527, filed on Apr. 28, 2021, now Pat. No. 11,568,634.

(51) Int. Cl.
*G06V 10/98* (2022.01)
*G06N 20/20* (2019.01)
(Continued)

(52) U.S. Cl.
CPC .......... *G06V 10/993* (2022.01); *G06F 18/214* (2023.01); *G06F 18/2163* (2023.01);
(Continued)

(58) Field of Classification Search
CPC .......... G06N 3/08; G06N 3/082; G06N 3/088; G06N 20/00; G06N 20/20; G06V 10/993;
(Continued)

(56) References Cited

U.S. PATENT DOCUMENTS

| 4,668,982 A | * | 5/1987 | Tinnerino | ............... | G03F 7/706 |
| | | | | | 348/129 |
| 6,791,574 B2 | * | 9/2004 | Hoch | ................... | H04N 5/2224 |
| | | | | | 348/E5.022 |

(Continued)

OTHER PUBLICATIONS

Suin et al., Degradation Aware Approach to Image Restoration Using Knowledge Distillation, IEEE Journal of Selected Topics in Signal Processing, vol. 15, No. 2, Dec. 9, 2020, pp. 162-173.
(Continued)

*Primary Examiner* — Amir Alavi
(74) *Attorney, Agent, or Firm* — DLA PIPER LLP (US)

(57) ABSTRACT

A computing system receives, from a client device, an image of a content item uploaded by a user of the client devices. The computing system divides the image into one or more overlapping patches. The computing system identifies, via a first machine learning model, one or more distortions present in the image based on the image and the one or more overlapping patches. The computing system determines that the image meets a threshold level of quality. Responsive to the determining, the computing system corrects, via a second machine learning model, the one or more distortions present in the image based on the image and the one or more overlapping patches. Each patch of the one or more overlapping patches are corrected. The computing system reconstructs the image of the content item based on the one or more corrected overlapping patches.

20 Claims, 5 Drawing Sheets

(51) Int. Cl.
  *G06V 30/40* (2022.01)
  *G06V 10/20* (2022.01)
  *G06V 10/26* (2022.01)
  *G06T 5/00* (2006.01)
  *G06F 18/214* (2023.01)
  *G06F 18/21* (2023.01)
  *G06V 30/10* (2022.01)

(52) U.S. Cl.
  CPC ............ *G06N 20/20* (2019.01); *G06T 5/006* (2013.01); *G06V 10/20* (2022.01); *G06V 10/273* (2022.01); *G06V 30/40* (2022.01); *G06T 2207/20081* (2013.01); *G06T 2207/30176* (2013.01); *G06V 30/10* (2022.01)

(58) Field of Classification Search
  CPC .... G06V 10/26; G06V 10/267; G06V 10/273; G06V 30/40; G06K 9/6256; G06K 9/6261; G06T 3/4046; G06T 9/002; G06T 5/00; G06T 5/001; G06T 5/006; G06T 5/10; G06T 5/20; G06T 5/40; G06T 5/50; G06T 2207/20081; G06T 2207/20172; G06T 2207/20212
  See application file for complete search history.

(56) References Cited

U.S. PATENT DOCUMENTS

| | | | |
|---|---|---|---|
| 8,564,502 B2 * | 10/2013 | Cui | G01S 13/723 345/7 |
| 8,885,218 B2 * | 11/2014 | Hirose | G03G 15/5062 358/1.14 |
| 9,076,206 B2 * | 7/2015 | Medasani | G06T 7/194 |
| 9,197,887 B2 * | 11/2015 | Cho | H04N 9/3185 |
| 9,317,893 B2 * | 4/2016 | Chen | G06T 3/0031 |
| 9,485,432 B1 | 11/2016 | Medasani | |
| 9,697,591 B2 * | 7/2017 | Paik | G06T 3/0018 |
| 10,019,788 B1 | 7/2018 | Kish | |
| 10,303,771 B1 | 5/2019 | Jezewski | |
| 10,345,437 B1 | 7/2019 | Russell | |
| 10,430,708 B1 | 10/2019 | Hu | |
| 10,580,430 B2 | 3/2020 | Jain | |
| 10,581,469 B1 | 3/2020 | O'Shea | |
| 10,599,952 B1 | 3/2020 | Farivar | |
| 10,674,152 B2 | 6/2020 | Coelho | |
| 10,726,558 B2 | 7/2020 | Ruda | |
| 10,880,551 B2 | 12/2020 | Topiwala | |
| 10,984,272 B1 | 4/2021 | Shrivastava | |
| 11,367,165 B2 * | 6/2022 | Xiao | G06T 3/4046 |
| 11,483,547 B2 * | 10/2022 | Naidu | B60R 11/04 |
| 11,568,634 B2 * | 1/2023 | Jonnalagedda | G06N 20/20 |
| 2011/0158533 A1 * | 6/2011 | Gutelzon | G06T 3/4046 382/176 |
| 2021/0027434 A1 | 1/2021 | Sheridan et al. | |

OTHER PUBLICATIONS

Search Report dated Jul. 8, 2022 issued in International Application No. PCT/US2022/021702.
Written Opinion dated Jul. 8, 2022 issued in International Application No. PCT/US2022/021702.

* cited by examiner

MACHINE LEARNING PIPELINE FOR DOCUMENT IMAGE QUALITY DETECTION AND CORRECTION

CROSS REFERENCE TO RELATED APPLICATIONS

This application is a Continuation Application of U.S. application Ser. No. 17/243,527 filed Apr. 28, 2021. The entirety of the above-listed application is incorporated herein by reference.

BACKGROUND

Natural language processing and optical character recognition techniques are routinely used for processing and understanding electronic documents and images, as well as extracting data from electronic documents and images for processing by downstream modules. While natural language processing and optical character recognition techniques continue to improve, there is a limit to their processing power based on the quality of the electronic document or image that is provided to the processing modules.

DETAILED DESCRIPTION OF SEVERAL EMBODIMENTS

The described system and method include one or more techniques for correcting an image of a content item for downstream processing. A computing system receives, from a client device, an image of a content item uploaded by a user of the client device. The computing system divides the image into one or more overlapping patches. The computing system identifies, via a first machine learning model, one or more distortions present in the image based on the image and the one or more overlapping patches. The computing system determines that the image meets a threshold level of quality. Responsive to the determining, the computing system corrects, via a second machine learning model, the one or more distortions present in the image based on the image and the one or more overlapping patches. Each patch of the one or more overlapping patches are corrected. The computing system reconstructs the image of the content item based on the one or more corrected overlapping patches.

Figure 1:
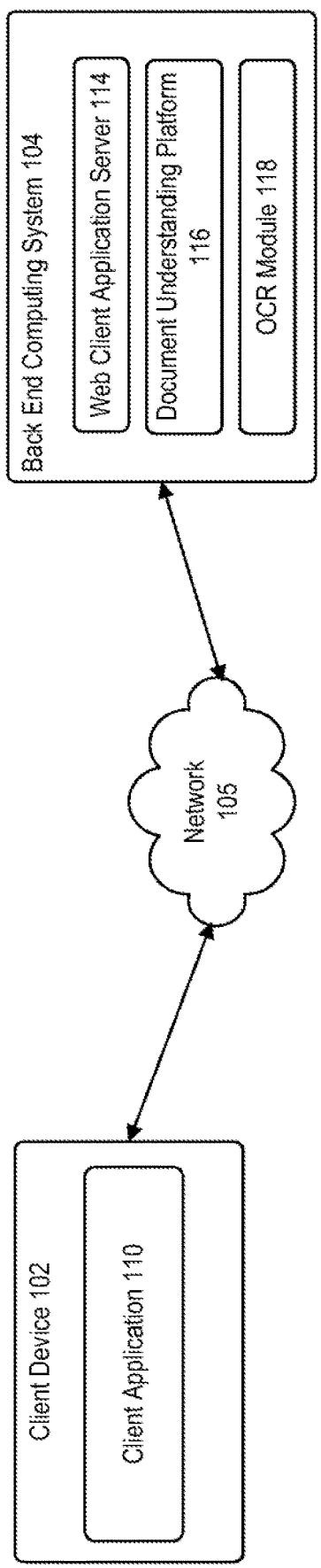
FIG. 1 shows an example computing environment, according to various embodiments of the present disclosure.

FIG. 1 shows an example computing environment 100, according to embodiments of the present disclosure. Computing environment 100 may include one or more user devices 102 and a back-end computing system 104. The user devices 102 and back-end computing system 104 may be configured to communicate through network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 105 may be the Internet, a private data network, virtual private network using a public network and/or other suitable connection(s) that enables components in computing environment 100 to send and receive information between the components of computing environment 100.

In some embodiments, communication between the elements may be facilitated by one or more application programming interfaces (APIs). APIs of back-end computing system 104 may be proprietary and/or may be examples available to those of ordinary skill in the art such as Amazon® Web Services (AWS) APIs or the like.

Client device 102 may be operated by a user. Client device 102 may be representative of a mobile device, a tablet, a desktop computer, or any computing system having the capabilities described herein. Client device 102 may include at least client application 110. Application 110 may be representative a web browser or a stand-alone application associated with back-end computing system 104. A user of client device 102 will utilize application 110 to access functionality associated with back-end computing system 104. In some embodiments, client device 102 may communicate over network 105 to request a web page, for example, from web client application server 114. In some embodiments, client device 102 may utilize application 110 to upload one or more content items to back-end computing system 104 for further processing. For example, client device 102 may upload one or more tax or financial documents to back-end computing system 104 via application 110 as part of a tax preparation process.

Back-end computing system 104 is configured to communicate with one or more client devices 102. As shown, back-end computing system 104 may include a web client application server 114, a document understanding platform 116, and an optical character recognition (OCR) module 118. Each of document understanding platform 116 and OCR module 118 may be comprised of one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather as a result of the instructions.

In one or more embodiments, OCR module 118 is configured to automate the process of content item classification and information extraction using one or more machine learning techniques. In some embodiments, OCR module 118 may receive a content item for classification and information extraction via application 110. For example, OCR module 118 may allow a user to upload a content item via application 110 such that OCR module 118 can automatically extract text and layout information from the content item and facilitate additional downstream modules such as classifying the content item and extracting data from the content item, rather than requiring the user to manually input data reflected in the content item. As those skilled in the art recognize, OCR techniques work fairly well with high quality scans of content items; however, their performance can be seriously impaired by common image quality issues, such as, but not limited to rotation, blur, excessive background noise, and the like.

To aid in downstream OCR processing, in some embodiments content item uploads are first provided to document understanding platform 116. Document understanding platform 116 is configured to detect image quality issues prior to passing content items to OCR module 118. In this manner, document understanding platform 116 may enhance the performance of OCR module 118, as well as downstream capabilities of other components of back-end computing system 104.

Figure 2:
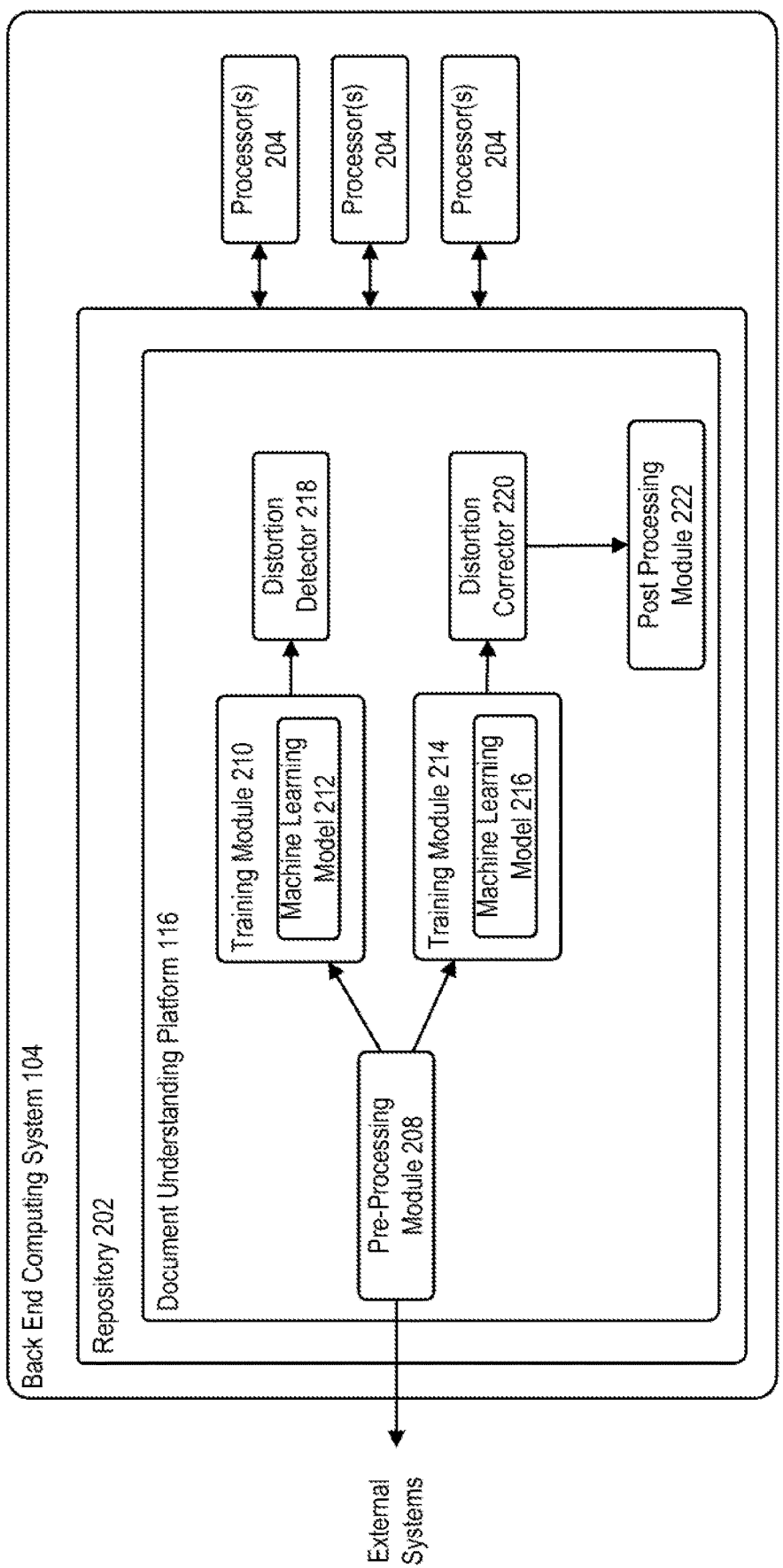
FIG. 2 is a block diagram illustrating a back-end computing system, according various embodiments of the present disclosure.

FIG. 2 is a block diagram illustrating back-end computing system 104, according to one or more embodiments disclosed herein. As shown in the illustrated example, back-end computing system 104 includes a repository 202 and one or more computer processors 204. In some embodiments, back-end computing system 104 may take the form of the computing device 500 described in FIG. 5 and the accompanying description below. In one or more embodiments, one or more computer processors 204 may take the form of computer processor(s) 502 described in FIG. 5 and the accompanying description below.

In some embodiments, repository 202 may be any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes document understanding platform 116.

Document understanding platform 116 is configured to process one or more content items uploaded by a user via application 110. Document understanding platform 116 may include a machine-learning driven pipeline configured to detect and correct image quality issues prior to passing content items to OCR module 118 for further processing. For example, document understanding platform 116 may combine multiple computer vision techniques, in which an image of a content item may first be pre-processed using a supervised cropping algorithm, followed by distortion classification via a discrete cosine transform (DCT) based convolutional neural network (CNN), and then distortion correction via a generative adversarial model with cycle consistence (Cycle-GAN). An output of the machine-learning driven pipeline may be an enhanced document image with the background cropped out and distortions removed. In this manner, the enhanced document image may be provided to OCR module 118 for further processing.

As shown, document understanding platform 116 includes a pre-processing engine 208, a training module 210, a training module 214, and a post processing module 222. Each of pre-processing engine 208, training module 210, training module 214, and post processing module 222 may be comprised of one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather as a result of the instructions.

Pre-processing engine 208 is configured to perform one or more pre-processing operations on images before being passed to downstream modules of document understanding platform 116. In some embodiments, pre-processing engine 208 may receive a raw image, as input, from client device 102. In some embodiments, the one or more pre-processing operations may include pre-processing engine 208 utilizing one or more supervised cropping algorithms trained to crop the image. In some embodiments, pre-processing engine 208 may crop the image at its edges. In some embodiments, the one or more pre-processing operations may include pre-processing engine 208 removing any background information from the image. In some embodiments, the one or more pre-processing operations may include pre-processing engine 208 converting red-green-blue (RGB) images to greyscale images and utilizing zero components analysis (ZCA) whitening techniques. In this manner, pre-processing engine 208 may normalize the intensity of the image, thus improving memory utilization by reducing the amount of storage typically required.

Following the one or more pre-processing operations, pre-processing engine 208 divides the image into one or more overlapping patches. In this manner, pre-processing engine 208 may significantly improve document resolution for downstream processing in document understanding platform 116.

Pre-processing engine 208 may further be configured to generate one or more training data sets for downstream use by training module 210 and/or training module 214. In some embodiments, pre-processing engine 208 may retrieve a set of images from one or more external systems. Each image may correspond to an image of a content item. For example, each image may generally include text to later be extracted by OCR module 118. For each image in the training data set, pre-processing engine 208 is configured to perform the one or more pre-processing operations. Pre-processing engine 208 may further divide each image in the training data set into one or more overlapping patches.

Training module 210 is configured to train machine learning model 212 to detect the types of distortions present in an image. For example, for each image in the training data set, training module 210 may train machine learning model 212 to detect one or more distortions presented therein. In some embodiments, training module 210 may train machine learning model 212 to detect one or more distortions in each patch of the one or more patches corresponding to an image in the training data set.

In some embodiments, machine learning model 212 may take the form of a DCT CNN (discrete cosine transformation and convolutional neural network). Accordingly, machine learning model 212 may include one or more convolutional layers that may be based on eigen decomposition of twodimensional DCT. In some embodiments, machine learning model 212 may include a 64-channel DCT passed through a 50 layer residual DCT CNN. In operation, the images may first go through the DCT to generate one or more DCT coefficients. The DCT coefficients of the images may be fed into a CNN model for image classification.

After training, training module 210 outputs a fully trained distortion detector 218. Distortion detector 218 may be optimized to detect the types of distortions present in an image of a content item. In some embodiments, distortion detector 218 may be optimized to detect the types of distortions present in the image on a patch-by-patch basis. Once the types of distortions are detected, distortion detector 218 may be further configured to perform one or more post processing operations to the image. For example, distortion detector 218 may post-process the image using one or more of binarization, histogram normalization, feature concatenation, and/or dimensionality reduction techniques.

Training module 214 is configured to train machine learning model 216 to correct one or more distortions present within an image. For example, for each image, in the training data set, training module 214 may train machine learning model 216 to correct one or more distortions present therein. In some embodiments, training module 214 may train machine learning model 216 to correct one or more distortions in each patch of the one or more patches corresponding to an image in the training data set.

In some embodiments, machine learning model 216 is representative of a cycle-GAN model. As such, machine learning model 216 may include two generative adversarial networks that may be coupled and trained using images from two different domains. For example, the first domain may correspond to document images with distortions; the second domain may correspond to document images without distortions. One of the benefits of using cycle-GAN as machine learning model 216, as opposed to other machine learning architectures, is that there is no requirement that the training data set include a document image with distortions and the same document image without distortions. Instead, cycle-GAN may adapt to a training process by which there can be any set of images in the first domain and any set of images in the second domain, without the requirement that the second domain include undistorted versions of images in the first domain.

Training module 214 trains machine learning model 216 to translate images from one domain to the other domain with cycle consistency. For example, training module 214 may train machine learning model 216 to undergo both transformations, i.e., clean-to-distorted-to clean and distorted-to-clean-to-distorted. In this manner, training module 214 may train machine learning model 216 to generate an image as close as possible to the original untransformed image.

After training, training module 214 outputs a fully trained distortion corrector 220. Distortion corrector 220 may be optimized to correct for any distortions present in an image of a content item. In some embodiments, distortion corrector 220 may be optimized to correct distortion in the image on a patch-by-patch basis. During run-time, distortion corrector 220 does not need to convert the image from clean-to-distorted-to clean or from distorted-to-clean-to-distorted. Instead, distortion corrector 220 only needs to convert the image from a distorted image to a clean image.

In the illustrated example, post processing module 222 is configured to receive output from distortion corrector 220. For example, post processing module 222 may receive, as input, one or more corrected patches of an image. Post processing module 222 is configured to stitch the image back together using the one or more corrected patches. In some embodiments, the patches may be overlapping. In such case, post processing module 222 may average the overlapping regions of the patches in order to stitch the patches together. In this manner, post processing module 222 constructs a corrected version of the image based on the corrected patches provided by distortion corrector 220. In some embodiments, post processing module 222 may further be configured to perform one or more image sharpening techniques to the output image.

Figure 3:
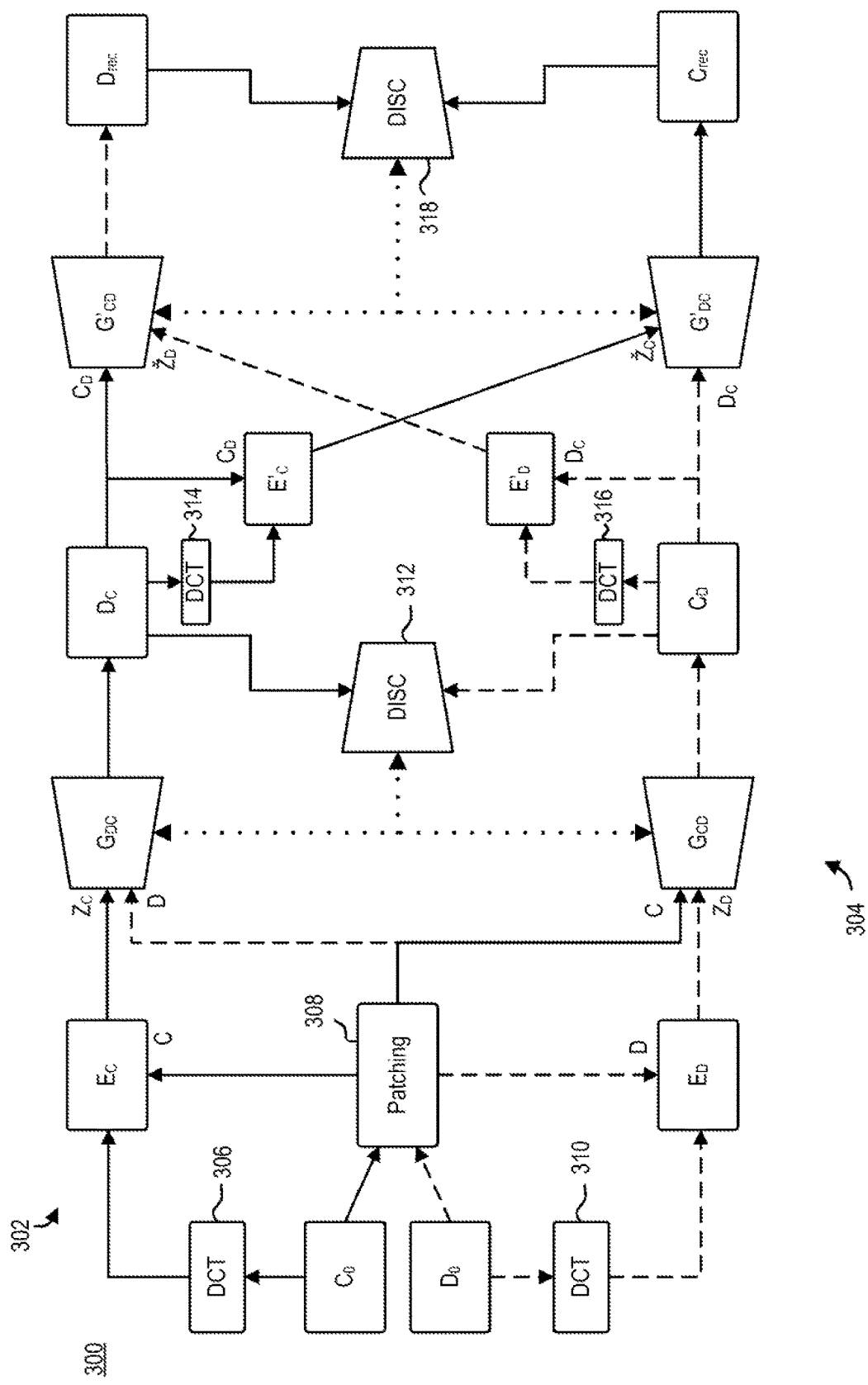
FIG. 3 is a block diagram illustrating an architecture of a machine learning model, according to various embodiments of the present disclosure.

FIG. 3 is a block diagram illustrating exemplary architecture 300 of machine learning model 216, according to example embodiments. As described in FIG. 2, machine learning model 216 may take the form of a cycle-GAN model. Accordingly, machine learning model 216 may include two generative adversarial networks that are coupled and trained using images from two different domains. Machine learning model 216 may be trained to translate images from one domain to the other with cycle consistency, where an image undergoes both transformations.

As shown, architecture 300 includes a first generative adversarial network 302 and a second generative adversarial network 304. First generative adversarial network 302 may be coupled with second generative adversarial network 304. First generative adversarial network 302 receives, as input, a clean image $C_0$. In some embodiments, clean image $C_0$ may be representative of a plurality of patches associated with a clean image $C_0$. In some embodiments, clean image $C_0$ may be representative of a single patch associated with a clean image $C_0$. Clean image, $C_0$, is passed to a discrete cosine transform (DCT) filter 306. DCT filter 306 may be configured to generate one or more DCT coefficients based on clean image, $C_0$. In some embodiments, and as shown, clean image $C_0$ is also provided to patching layer 308. Patching layer 308 is configured to provide the patched version of the image to encoder, $E_C$.

The output from DCT filter 306 and patching layer 308 are provided to encoder, $E_c$. Encoder, $E_c$ is configured to encode the outputs provided by DCT filter 306 and patching layer 308. Encoder, $E_c$ may be representative of a plurality of convolutional layers configured to learn and extract features from clean image, $C_0$. Encoder, $E_c$ generates a latent spectral representation, $Z_c$ of the image based on the inputs provided by DCT filter 306 and patching layer 308. In the illustrated example, latent spectral representation, $Z_c$ is provided to generator, $G_{DC}$.

Generator $G_{DC}$ is configured to generate a distorted version of the clean image. For example, as shown, generator $G_{DC}$, may receive, as input, $Z_c$ from $E_c$ and D from patching layer 308. D represents the patched version of a distorted image $D_0$. Using latent spectral representation $Z_c$ of clean image $C_0$ and the patched version D of distorted image $D_0$, generator $G_{DC}$ is configured to distort the clean image. For example, as output, $G_{DC}$ generates $D_c$, where $D_c$ corresponds to a distorted version of the clean image in patched version, C.

Referring to second generative adversarial network 304, second generative adversarial network 304 receives, as input, a distorted image $D_0$. Distorted image, $D_0$, is passed to a DCT filter 310. DCT filter 310 is configured to generate one or more DCT coefficients based on distorted image, $D_0$. In some embodiments, as shown, distorted image $D_0$ may further be provided to patching layer 308. For example, a patched version of distorted image $D_0$ may be provided to patching layer 308. Patching layer 308 is configured to provide the patched version of the distorted image, i.e., D, to encoder, $E_D$.

The output from DCT filter 310 and patches D from patching layer 308 are provided to encoder, $E_D$. Encoder $E_D$ is configured to encode the outputs provided by DCT filter 310 and patching layer 308. Encoder $E_D$ may be representative of a plurality of convolutional layers configured to learn and extract features from distorted image $D_0$. Encoder $E_D$ generates a latent spectral representation $Z_D$ of the image based on the inputs provided by DCT filter 310 and patching layer 308. Latent spectral representation $Z_D$ is provided to generator $G_{CD}$.

Generator, $G_{CD}$ is configured to generate a clean version of the distorted image. For example, as shown, generator, $G_{CD}$, may receive, as input, $Z_D$ from $E_D$ and patched version C from patching layer 308. C may represent the patched version of a clean image $C_0$. Using latent spectral representation $Z_D$ of distorted image $D_0$ and the patched version C of clean image $C_0$, generator $G_{CD}$ is configured to clean patched version D. For example, as output, $G_{CD}$ generates $C_D$, where $C_D$ corresponds to a clean version of distorted patched version, D.

As shown, $C_D$ and $D_C$ may be provided to discriminator 312. Discriminator 312 may be configured to compare $C_D$ and $D_C$ to the original images and try to distinguish between them. Based on the comparison, discriminator 312 may utilize back propagation (represented by the dotted lines) to tune generator $G_{CD}$ and generator $G_{DC}$. For example, discriminator 312 tries to distinguish between the generated distorted image $D_C$ from the original distorted image $D_0$, as well as distinguish between the generated clean image $C_D$ from the original clean image $C_0$. In other words, the generators try to produce clean/distorted images as similar to images from the other domain as possible, while discriminator 312 tries to tell which images are original and which are generated.

$D_c$ is provided to DCT filter 314 as input. DCT filter 314 is configured to generate one or more DCT coefficients based on $D_C$. The outputs from DCT filter 314 and $C_D$ are provided to encoder, $E'_C$. Second encoder $E'_C$ may be configured similarly to encoder $E_c$. Encoder $E'_c$ is configured to encode the outputs provided by DCT filter 314 and $C_D$. Encoder $E'_c$ may be representative of a plurality of convolutional layers configured to learn and extract features from $C_D$. Encoder $E'_c$ generates a latent spectral representation $_c$ of the $C_D$ based on the inputs provided by DCT filter 314. $C_D$ is provided to DCT filter 316 as input. DCT filter 316 is configured to generate one or more DCT coefficients based on $C_D$. The output from DCT filter 316 may be provided to encoder $E'_D$. Encoder $E'_D$ may be configured similarly to encoder $E_D$. Encoder $E'_D$ may be configured to encode the output provided by DCT filter 316 and $D_C$. Encoder $E'_D$ may be representative of a plurality of convolutional layers configured to learn and extract features from D. Encoder $E'_D$ may generate a latent spectral representation, $_D$ of the $D_C$ based on the inputs provided by DCT filter 316.

As shown, latent spectral representation $_D$ may be provided as input to generator $G'_D$. Generator $G'_{CD}$ is configured to generate a distorted version of the clean image (i.e., the cleaned version of the distorted patches D). For example, as shown, generator, $G'_{CD}$, may receive, as input, $_D$ from $E'_D$, $D_C$, and $C_D$. Using latent spectral representation $_D$, $D_C$, and $C_D$, generator $G'_{CD}$ reconstructs the distorted version of the image, $D_{rec}$. In this manner, second generative adversarial network 304 cleans a distorted version and then distorts the cleaned version.

Similarly, latent spectral representation $_c$ is provided as input to generator $G'_{DC}$. Generator $G'_{DC}$ is configured to generate a clean version of the distorted image (i.e., the distorted version of the clean patches C). For example, as shown, generator, $G'_{DC}$, may receive, as input, $_c$ from $E'_C$, $D_C$, and $C_D$. Using latent spectral representation $_c$, $D_C$, and $C_D$, generator $G'_{DC}$ reconstructs the clean version of the image, $C_{rec}$. In this manner, first generative adversarial network 302 distorts a clean version and then cleans the distorted version.

As shown, $C_{rec}$ and $D_{rec}$ may be provided to discriminator 318. Discriminator 318 is configured to compare $C_{rec}$ and $D_{rec}$ to the intermediate images $C_D$ and $D_C$ and try to distinguish between them. Based on the comparison, discriminator 318 may utilize back propagation (represented by the dotted lines) to tune generator $G'_{CD}$ and generator $G'_{DC}$.

Although not explicitly stated, to aid the reader in following FIG. 3, the distorted to clean to distorted paths are illustrated with dashed lines; the clean to distorted to clean paths are illustrated with solid lines; and back propagation is illustrated with dotted lines.

Figure 4:
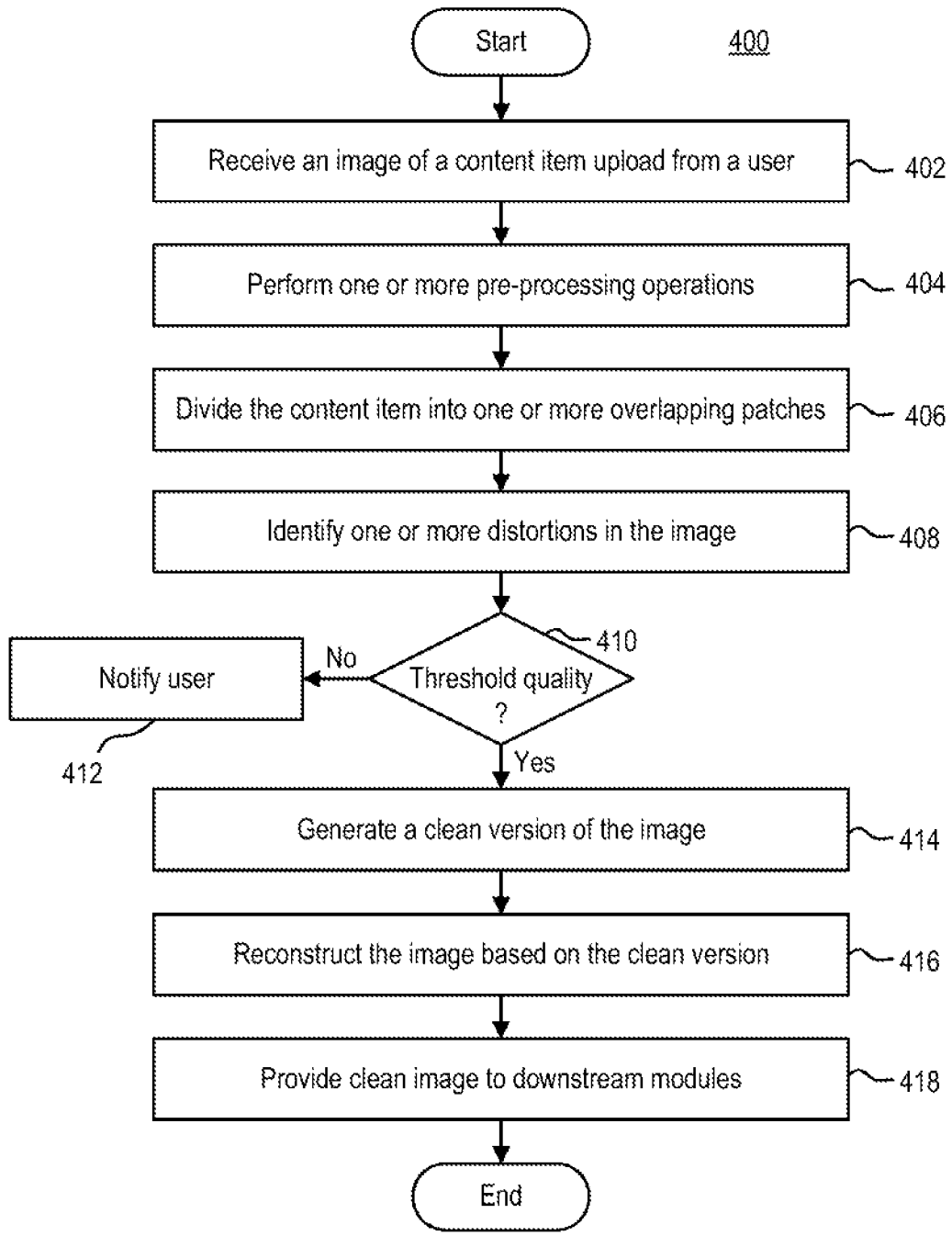
FIG. 4 is a flow diagram illustrating a method of correcting an image of a content item, according to various embodiments of the present disclosure.

FIG. 4 is a flow diagram illustrating a method 400 of correcting an image of a content item, according to one or more embodiments. Method 400 may begin at step 402.

At step 402, back-end computing system 104 receives a content item upload from a user. In some embodiments, back-end computing system 104 may receive a content item upload from a user via application 110 executing on client device 102. In some embodiments, the content item upload may be representative of a portable document format (PDF) version of a content item. In some embodiments, the content item upload may be representative of an image (e.g., JPEG, TIFF, etc.) of a content item. For example, a user may utilize client device 102 to capture an image of a content item for upload to back-end computing system 104.

At step 404, back-end computing system 104 performs one or more pre-processing operations to the content item. For example, pre-processing engine 208 performs one or more pre-processing operations on images before being passed to downstream modules of document understanding platform 116. In some embodiments, the one or more pre-processing operations may include pre-processing engine 208 utilizing one or more supervised cropping algorithms trained to crop the image. For example, using the one or more supervised cropping algorithms, pre-processing engine 208 may crop the image at its edges. In some embodiments, the one or more pre-processing operations may include pre-processing engine 208 removing any background information from the image. In some embodiments, the one or more pre-processing operations may include pre-processing engine 208 converting RGB images to greyscale images and ZCA whitening techniques. In this manner, pre-processing engine 208 may normalize the intensity of the image.

At step 406, back-end computing system 104 divides the content item into one or more overlapping patches. For example, following the one or more pre-processing operations, pre-processing engine 208 divides the image into one or more overlapping patches. In this manner, pre-processing engine 208 may preserve the legibility of any small text that may be present in the content item, before providing the content item to downstream modules.

At step 408, back-end computing system 104 identifies one or more distortions in the image. For example, distortion detector 218 may detect the types of distortions present in the image. Distortion detector 218 may utilize a trained DCT CNN to detect one or more distortions present in the image.

In some embodiments, distortion detector 218 may detect one or more distortions in each patch of the one or more patches corresponding to the image.

At step 410, back-end computing system 104 determines if the image meets a threshold level of quality. For example, distortion detector 218 may determine whether the image is suitable for correction, based on the one or more distortions identified. If, at step 410, distortion detector 218 determines that the image does not meet a threshold level of quality, i.e., the image is not suitable for correction, then method 400 proceeds to step 412. At step 412, a user may be notified of the quality. In some embodiments, such notification may prompt the user to upload a new or higher quality image of the content item.

If, however, at step 410, distortion detector 218 determines that the image meets a threshold level of quality, i.e., the image is suitable for correction, then method 400 proceeds to step 414.

At step 414, back-end computing system 104 generates a clean version of the image. For example, distortion corrector 220 may generate a clean version of the image based on the uploaded image and/or the one or more patches of the uploaded image. Distortion corrector 220 translates the image from the distorted domain to the clean domain. In some embodiments, distortion corrector 220 corrects distortion in the image on a patch-by-patch basis.

At step 416, back-end computing system 104 reconstructs the image based on the clean version generated by distortion corrector 220. For example, post processing module 222 is configured to receive the cleaned patches from distortion corrector 220. Post processing module 222 stitches the image back together using the one or more corrected patches. In some embodiments, the patches may be overlapping. In such case, post processing module 222 may average the overlapping regions of the patches in order to stitch the patches together. In this manner, post processing module 222 may construct a corrected version of the image based on the corrected patches provided by distortion corrector 220. In some embodiments, post processing module 222 may further be configured to perform one or more image sharpening techniques to the output image.

At step 418, back-end computing system 104 provides the clean image to OCR module 118 for further processing.

Figure 5:
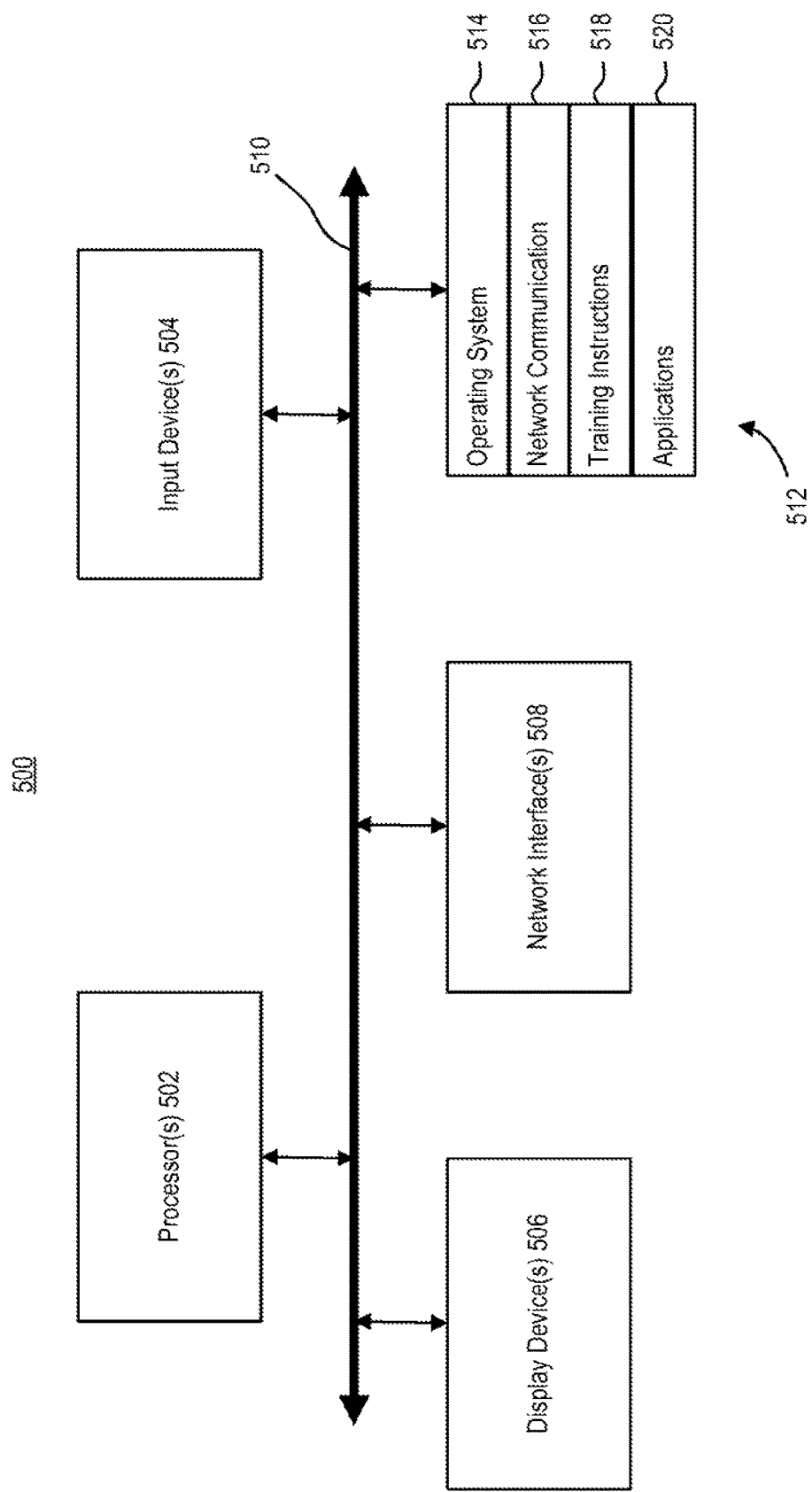
FIG. 5 is a block diagram illustrating an example computing device, according to various embodiments of the present disclosure.

FIG. 5 shows an example computing device according to an embodiment of the present disclosure. For example, computing device 500 may function as back-end computing system 104. The illustrated computing device 500 includes a document understanding platform that executes the image processing operations described above or a portion or combination thereof in some embodiments. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processors 502, one or more input devices 504, one or more display devices 506, one or more network interfaces 508, and one or more computer-readable mediums 512. Each of these components may be coupled by bus 510, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium 512 may be any non-transitory medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Training instructions 518 may include instructions that enable computing device 500 to function as document upload system and/or to train one or more machine learning models to work in conjunction to correct for distortions present in an image. Application(s) 520 may be an application that uses or implements the processes described herein and/or other processes. The processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a computing system comprising:
dividing an image into one or more overlapping patches;
identifying one or more distortions present in the image based on the image and the one or more overlapping patches;
determining, based on the identifying, that the image meets a threshold level of quality;
correcting the one or more distortions present in the image based on the image and the one or more overlapping patches; and
reconstructing the image based on the corrections.

2. The method of claim 1, further comprising:
cropping the image at edges of content captured in the image.

3. The method of claim 1, further comprising:
removing background information from the image.

4. The method of claim 1, further comprising:
converting the image into a greyscale version of the image.

5. The method of claim 1, wherein the one or more distortions are identified by a first machine learning model, the method further comprising:
training the first machine learning model by:
generating a training data set comprising a plurality of images of content items; and
learning, by the first machine learning model, to identify types of distortions present in each image of the plurality of images.

6. The method of claim 1, wherein the one or more distortions are corrected by a second machine learning model, the method further comprising:
training the second machine learning model by:
generating a training data set comprising a plurality of images of content items, wherein the plurality of images comprises a first subset of clean images and a second subset of distorted images;
for each clean image in the first subset of clean images, learning, by the second machine learning model, to generate a distorted version of the clean image from the clean image; and
for each distorted image in the second subset of images, learning, by the second machine learning model, to generate a clean version of the distorted image from the distorted image.

7. The method of claim 1, further comprising:
providing the reconstructed image to an optical character recognition module for further processing.

8. A non-transitory computer readable medium having one or more sequences of instructions, which, when executed by a processor, causes a computing system to perform operations comprising:

dividing an image into one or more overlapping patches;
identifying one or more distortions present in the image based on the image and the one or more overlapping patches;
determining, based on the identifying, that the image meets a threshold level of quality;
correcting the one or more distortions present in the image based on the image and the one or more overlapping patches; and
reconstructing the image based on the corrections.

9. The non-transitory computer readable medium of claim 8, the operations further comprising:
cropping the image at edges of content captured in the image.

10. The non-transitory computer readable medium of claim 8, the operations further comprising:
removing background information from the image.

11. The non-transitory computer readable medium of claim 8, the operations further comprising:
converting the image into a greyscale version of the image.

12. The non-transitory computer readable medium of claim 8, wherein the one or more distortions are identified by a first machine learning model, the operations further comprising:
training the first machine learning model by:
generating a training data set comprising a plurality of images; and
learning, by the first machine learning model, to identify types of distortions present in each image of the plurality of images.

13. The non-transitory computer readable medium of claim 8, wherein the one or more distortions are corrected by a second machine learning model, the operations further comprising:
training the second machine learning model by:
generating a training data set comprising a plurality of images of content items, wherein the plurality of images comprises a first subset of clean images and a second subset of distorted images;
for each clean image in the first subset of clean images, learning, by the second machine learning model, to generate a distorted version of the clean image from the clean image; and
for each distorted image in the second subset of images, learning, by the second machine learning model, to generate a clean version of the distorted image from the distorted image.

14. The non-transitory computer readable medium of claim 8, the operations further comprising:
providing the reconstructed image to an optical character recognition module for further processing.

15. A system comprising:
a processor; and
a memory having one or more instructions stored thereon, which, when executed by the processor, causes the system to perform operations comprising:
dividing an image into one or more overlapping patches;
identifying one or more distortions present in the image based on the image and the one or more overlapping patches;
determining, based on the identifying, that the image meets a threshold level of quality;
correcting the one or more distortions present in the image based on the image and the one or more overlapping patches; and
reconstructing the image based on the corrections.

16. The system of claim 15, the operations further comprising:
cropping the image at edges of content captured in the image.

17. The system of claim 15, the operations further comprising:
removing background information from the image.

18. The system of claim 15, the operations further comprising:
converting the image into a greyscale version of the image.

19. The system of claim 15, wherein the one or more distortions are identified by a first machine learning model, the operations further comprising:
training the first machine learning model by:
generating a training data set comprising a plurality of images; and
learning, by the first machine learning model, to identify types of distortions present in each image of the plurality of images.

20. The system of claim 15, wherein the one or more distortions are corrected by a second machine learning model operations, the operations further comprising:
training the second machine learning model by:
generating a training data set comprising a plurality of images, wherein the plurality of images comprises a first subset of clean images and a second subset of distorted images;
for each clean image in the first subset of clean images, learning, by the second machine learning model, to generate a distorted version of the clean image from the clean image; and
for each distorted image in the second subset of images, learning, by the second machine learning model, to generate a clean version of the distorted image from the distorted image.

* * * * *